United States Patent
Jauvtis et al.

(10) Patent No.: US 8,826,495 B2
(45) Date of Patent: Sep. 9, 2014

(54) HINGED DUAL PANEL ELECTRONIC DEVICE

(75) Inventors: Nathan Isaiah Jauvtis, San Francsico, CA (US); Philip J. Houdek, II, San Jose, CA (US); Dan Page Wilkins, San Jose, CA (US); Stan Moiseyenko, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 13/151,164

(22) Filed: Jun. 1, 2011

(65) Prior Publication Data

US 2011/0291536 A1    Dec. 1, 2011

Related U.S. Application Data

(60) Provisional application No. 61/350,472, filed on Jun. 1, 2010.

(51) Int. Cl.
*E05D 1/00*    (2006.01)

(52) U.S. Cl.
USPC .......................................................... 16/225

(58) Field of Classification Search
USPC .......... 16/225–227; 403/121, 291; 455/575.1, 455/575.3, 575.4; 361/679.06, 679.07; 439/312, 376, 378; 174/98, 99 R
See application file for complete search history.

(56) References Cited

U.S. PATENT DOCUMENTS

| | | | |
|---|---|---|---|
| 3,132,911 A * | 5/1964 | Heidler | 439/31 |
| 4,163,303 A * | 8/1979 | Hanna | 16/227 |
| 4,619,304 A * | 10/1986 | Smith | 160/135 |
| 4,821,373 A * | 4/1989 | Maidment et al. | 16/227 |
| 5,355,555 A * | 10/1994 | Zarelius | 16/225 |
| 5,410,779 A * | 5/1995 | Esman et al. | 16/370 |
| 5,461,581 A | 10/1995 | Hallwirth et al. | |
| 5,610,825 A | 3/1997 | Johnson et al. | |
| 5,819,032 A | 10/1998 | de Vries et al. | |
| 5,870,552 A | 2/1999 | Dozier et al. | |
| 5,870,559 A | 2/1999 | Leshem et al. | |
| 5,893,899 A | 4/1999 | Johnson et al. | |
| 5,920,864 A | 7/1999 | Zhao | |
| 5,958,008 A | 9/1999 | Pogrebisky et al. | |
| 5,987,704 A * | 11/1999 | Tang | 16/354 |
| 6,037,937 A | 3/2000 | Beaton et al. | |
| 6,138,072 A | 10/2000 | Nagai | |
| 6,144,962 A | 11/2000 | Weinberg et al. | |
| 6,157,381 A | 12/2000 | Bates et al. | |
| 6,168,341 B1 * | 1/2001 | Chene et al. | 403/76 |
| 6,237,006 B1 | 5/2001 | Weinberg et al. | |
| 6,288,704 B1 | 9/2001 | Flack et al. | |
| 6,292,188 B1 | 9/2001 | Carlson et al. | |
| 6,537,103 B2 * | 3/2003 | Jamison | 439/452 |

(Continued)

*Primary Examiner* — Victor Batson
*Assistant Examiner* — Matthew Sullivan
(74) *Attorney, Agent, or Firm* — Patent Capital Group

(57) ABSTRACT

A electronic device includes a first housing body with a first hinged end, a first free end, and a first fastening surface between the first hinged end and the first free end. A second housing body has a second hinged end, a second free end, and a second fastening surface between the second hinged end and the second free end. A flexible member is fixed to the first fastening surface and passes though the first hinged end and through the second hinged end for connection to a sliding cartridge that is affixed to the second fastening surface. The sliding cartridge provides substantially constant resistance during 360° rotation between the first housing body and the second housing body.

18 Claims, 16 Drawing Sheets

(56) References Cited

U.S. PATENT DOCUMENTS

| | | |
|---|---|---|
| 7,100,119 B2 | 8/2006 | Keely et al. |
| 7,251,413 B2 | 7/2007 | Dow et al. |
| 7,425,103 B2 * | 9/2008 | Perez-Sanchez ............ 403/121 |
| 7,450,114 B2 | 11/2008 | Anwar |
| 7,576,730 B2 | 8/2009 | Anwar |
| 7,689,928 B1 | 3/2010 | Gilra |
| 7,735,104 B2 | 6/2010 | Dow et al. |
| 7,774,358 B2 | 8/2010 | Tamas et al. |
| 8,155,498 B2 | 4/2012 | Dow et al. |
| 8,627,547 B2 * | 1/2014 | Soh ................. 16/369 |
| 2002/0011990 A1 | 1/2002 | Anwar |
| 2002/0024506 A1 | 2/2002 | Flack et al. |
| 2002/0080195 A1 | 6/2002 | Carlson et al. |
| 2002/0113823 A1 | 8/2002 | Card |
| 2002/0133906 A1 * | 9/2002 | Fedon ............ 16/225 |
| 2003/0030852 A1 | 2/2003 | Sampson et al. |
| 2003/0202772 A1 | 10/2003 | Dow et al. |
| 2003/0202773 A1 | 10/2003 | Dow et al. |
| 2004/0194014 A1 | 9/2004 | Anwar |
| 2004/0221311 A1 | 11/2004 | Dow et al. |
| 2005/0051350 A1 * | 3/2005 | Porter et al. .............. 174/48 |
| 2005/0079477 A1 | 4/2005 | Diesel |
| 2006/0061551 A1 | 3/2006 | Fateh |
| 2006/0184901 A1 | 8/2006 | Dietz |
| 2006/0253493 A1 | 11/2006 | Tamas et al. |
| 2006/0274086 A1 | 12/2006 | Forstall et al. |
| 2006/0277460 A1 | 12/2006 | Forstall et al. |
| 2006/0294466 A1 | 12/2006 | Muller et al. |
| 2007/0180471 A1 | 8/2007 | Unz |
| 2008/0078055 A1 * | 4/2008 | Estlander ................ 16/225 |
| 2009/0015793 A1 | 1/2009 | Suzuki et al. |
| 2009/0044236 A1 | 2/2009 | Bendiabdallah et al. |
| 2009/0063960 A1 | 3/2009 | Anwar |
| 2009/0100380 A1 | 4/2009 | Gardner |
| 2009/0204663 A1 | 8/2009 | Patwari |
| 2009/0241054 A1 | 9/2009 | Hendricks |
| 2010/0077059 A1 | 3/2010 | Shen |
| 2010/0104269 A1 | 4/2010 | Prestenback et al. |
| 2010/0138875 A1 | 6/2010 | Johnson et al. |
| 2010/0185948 A1 | 7/2010 | Anwar |
| 2010/0185975 A1 | 7/2010 | Anwar |
| 2010/0192062 A1 | 7/2010 | Anwar |
| 2010/0211866 A1 | 8/2010 | Nicholas et al. |
| 2010/0278504 A1 | 11/2010 | Lyons et al. |
| 2010/0281372 A1 | 11/2010 | Lyons et al. |
| 2010/0281384 A1 | 11/2010 | Lyons et al. |
| 2011/0066965 A1 | 3/2011 | Choi |
| 2011/0167369 A1 | 7/2011 | van Os |
| 2011/0209058 A1 | 8/2011 | Hinckley et al. |
| 2011/0296344 A1 | 12/2011 | Habib et al. |
| 2011/0320950 A1 | 12/2011 | Rajput et al. |
| 2012/0090135 A1 * | 4/2012 | Soh ................. 16/250 |

* cited by examiner

HINGED DUAL PANEL ELECTRONIC DEVICE

CROSS REFERENCE TO RELATED APPLICATIONS

This application claims priority to U.S. Provisional Patent Application 61/350,472 filed Jun. 1, 2010, entitled "Enhanced Hinge", the contents of which are incorporated herein by reference.

FIELD OF THE INVENTION

This invention relates generally to consumer electronic devices. More particularly, this invention relates to a dual panel electronic device with an optimized hinge.

BACKGROUND OF THE INVENTION

Dual panel electronic devices are known. There are ongoing efforts to improve the hinges that connect dual panel electronic devices. The design challenges for such hinges include providing full rotation while maintaining substantially constant contact or a minimal gap between the hinged modules. Ideally, the hinge mechanism produces a substantially constant resistance through rotation about an axis. Finally, bulky internal or external components should also be avoided.

SUMMARY OF THE INVENTION

A electronic device includes a first housing body with a first hinged end, a first free end, and a first fastening surface between the first hinged end and the first free end. A second housing body has a second hinged end, a second free end, and a second fastening surface between the second hinged end and the second free end. A flexible member is fixed to the first fastening surface and passes though the first hinged end and through the second hinged end for connection to a sliding cartridge that is affixed to the second fastening surface. The sliding cartridge provides substantially constant resistance during 360° rotation between the first housing body and the second housing body.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
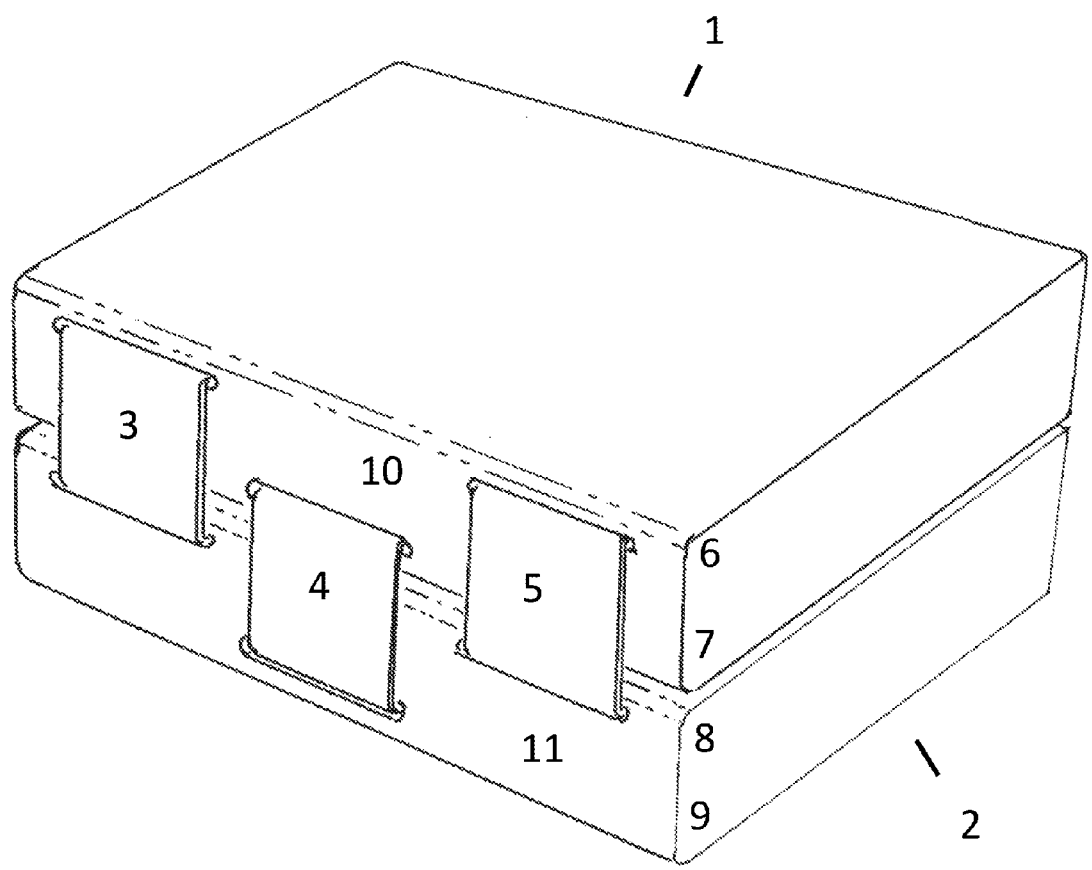
FIG. 1 is a view of two modules in the closed position.

FIG. 1 illustrates a first electronic module 1 and a second electronic module 2. By way of the example, the two electronic modules may form a dual panel electronic book reader. In this embodiment, the electronic device can be held like a traditional paper book or can be folded back upon itself such that both displays are facing outward. The hinge mechanism that connects the two modules uses flexible members between the two modules that can support tension loads and allow for up to 360 degrees of rotation between the two modules, while maintaining substantially constant contact or close proximity between the hinged modules. In this embodiment, the hinge mechanism entry and exit points for attachment reside on the edges of the objects. The entry and exit points may reside on the hinge end, such that only one face of each module is covered. For example, in FIG. 1, the flexible straps 3 and 5 enter module 1 by the long edge 6 and enter the module 2 by the long edge 8 such that they cover primarily a portion of face 10 of module 1. Likewise, the flexible strap 4 enters the modules 1 near the long edge 7 and enters the module 2 close to the long edge 9 such that the strap 4 covers primarily a portion of face 11 of module 2.

Figure 2:
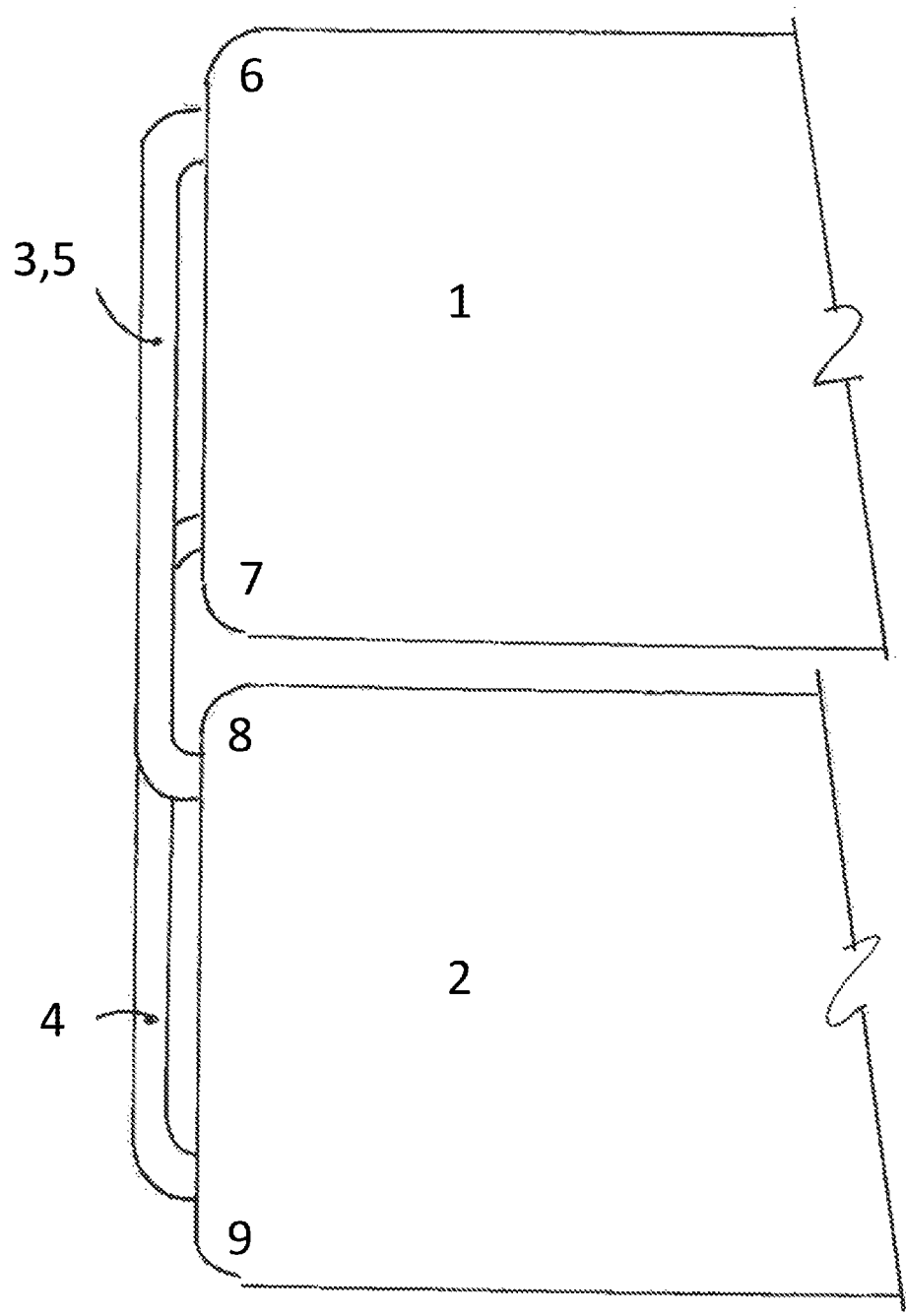
FIG. 2 is a side view of two modules in a closed position (0°).
Figure 3:
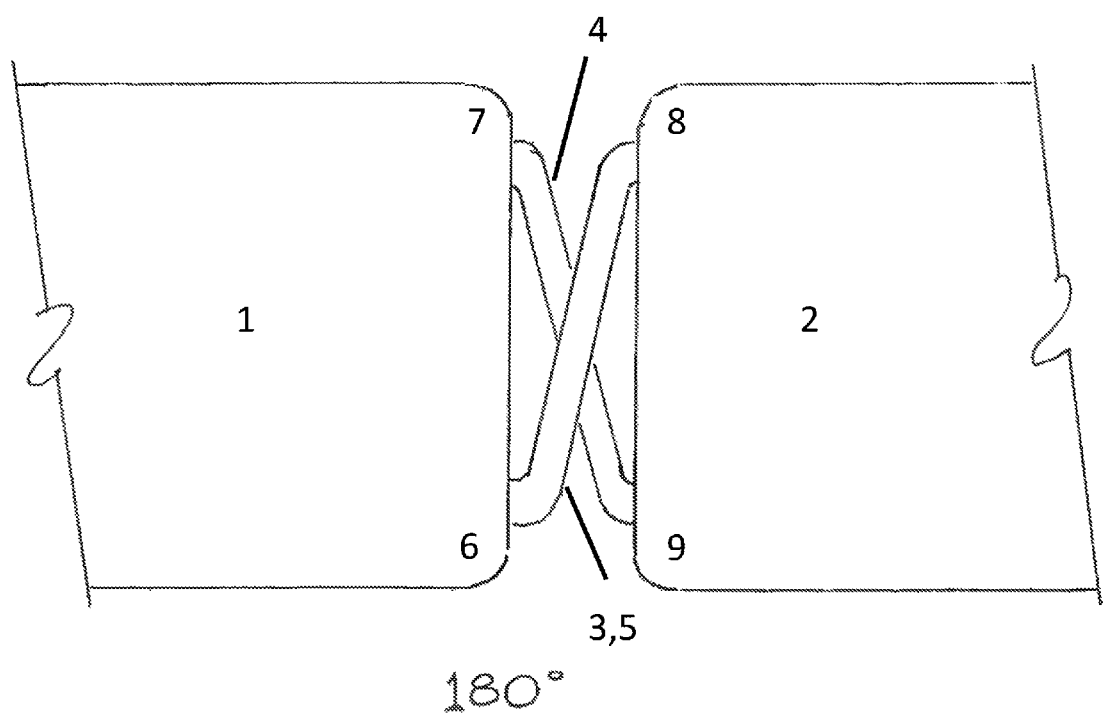
FIG. 3 is a side view of two modules in a flat open position (180°).
Figure 4:
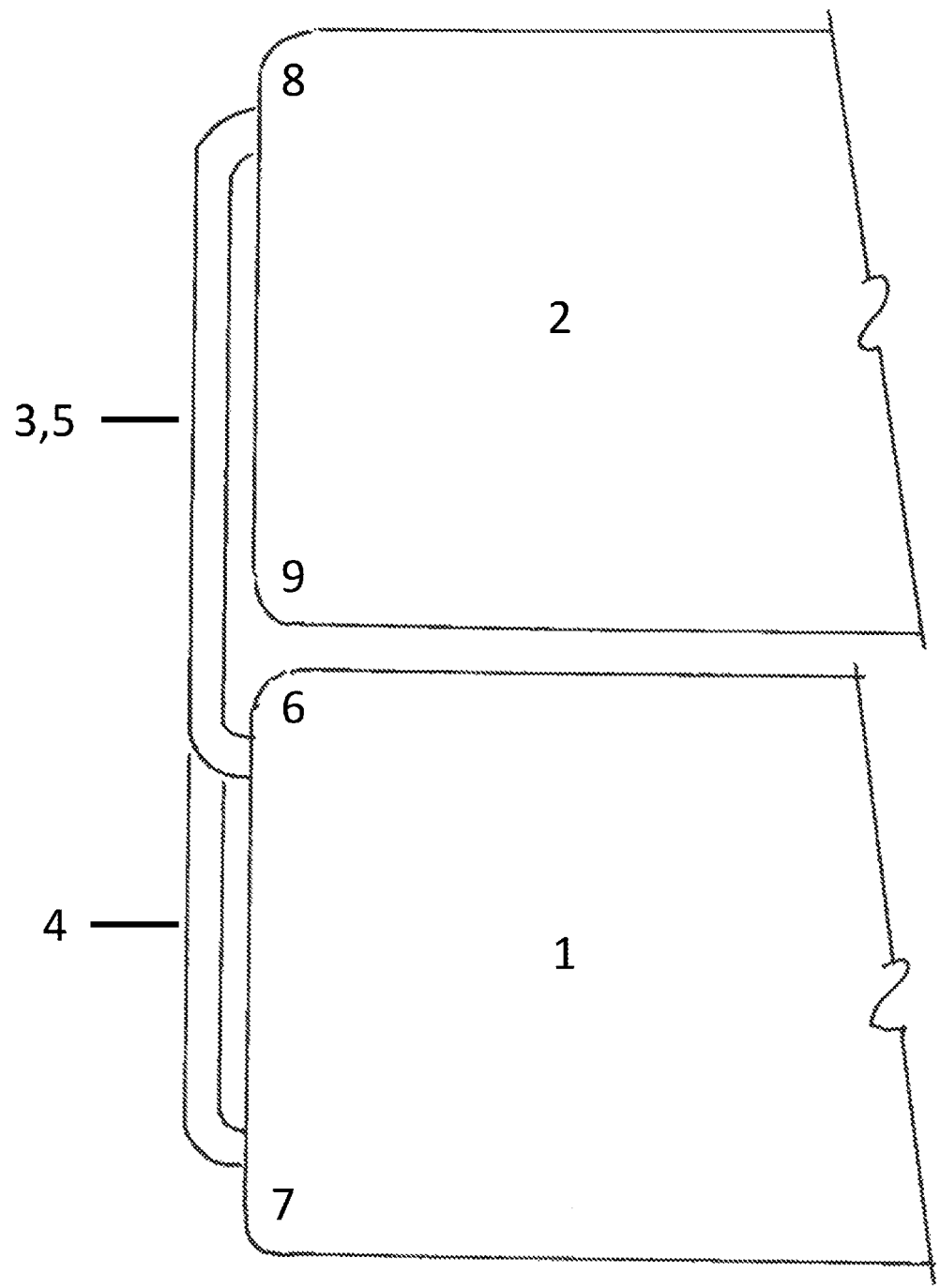
FIG. 4 is a side view of two modules in a rotated closed position (360°).

FIGS. 2, 3 and 4 show how the flexible straps allow the modules to rotate 360 degrees. In FIG. 2, the reader starts in the closed position with long edges 7 and 8 touching or in close proximity. The flexible straps 3, 4, and 5 allow the modules to rotate while keeping the edges 7 and 8 parallel and touching or in close proximity until the long edges 6 and 9 are also parallel and touching or in close proximity. At this point, as shown in FIG. 3, module 1 and module 2 are now side by side rather than stacked on top of each other. The modules can continue to rotate such that long edges 6 and 9 remain in close proximity until the modules 1 and 2 are once again in the stacked position as shown in FIG. 4. Note that now rather than long edges 7 and 8 touching or being in close proximity, long edges 6 and 9 are touching or are in close proximity. In this way, the entry and exit points of the straps are near potential pivot points.

To keep the modules in close contact as module 1 rotates from the zero degree position to the 180 degree position, the exposed length of straps 3, 4, and 5 must decrease and a portion of the strap material is pulled into the module. As module 1 continues to rotate from the 180 degree position to the 360 degree position, the exposed length of straps 3, 4 and 5 must increase and a portion of the strap material is pulled from inside the module. In order to maintain contact or close proximity between the two modules throughout the hinge motion, the variable exposed strap lengths are controlled by the hinge mechanism parts and subassemblies that are contained inside the modules. One additional alternate embodiment is to incorporate tension compliant straps with the ability to stretch.

Figure 5:
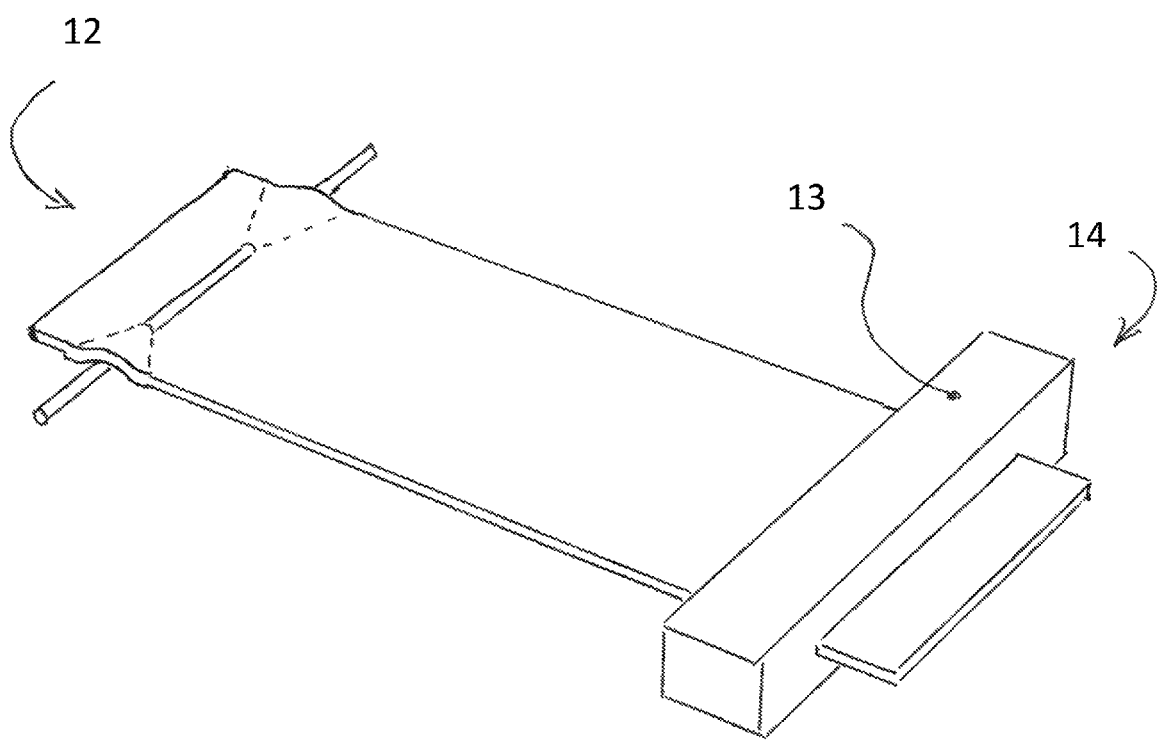
FIG. 5 is a view of the strap portion of the hinge mechanism.

In one embodiment, five flexible fabric straps are used, which have substantially no stretch in tension. In order to accommodate the difference in exposed strap length throughout the module range of motion, an integrated strap and spring cartridge mechanism is used. While it is possible to have both ends of each strap loaded under tension by springs or other means, one embodiment incorporates a strap having one fixed end 12 (first end) and a sprung end 14 (second end), as shown in FIG. 5. In this embodiment, the fixed end 12 of the strap is anchored by passing a rod through one or more holes that pierce the strap in a manner similar to how a curtain rod passes through a curtain. The rod is then anchored to its respective module. Other embodiments for connecting the fixed end of the strap to the module are adhesive, fasteners, clamping with a separate part, and a loop in the strap with additional parts locking it in place, along with other methods. In this embodiment, the second end of the hinge strap is loaded with springs using a low profile sliding cartridge 13 affixed to the strap, which rides on guide rods, and attaches to the strap within a second module.

Figure 6:
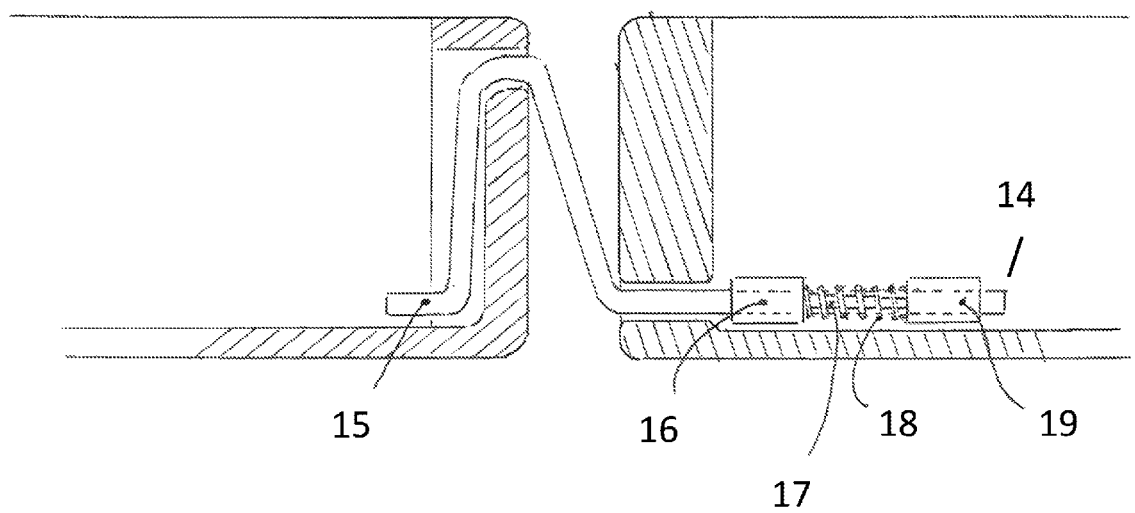
FIG. 6 is a view of the strap portion of the hinge mechanism connected to two modules.

Features of the mechanism and specifically the cartridge and tension components are designed to minimize the footprint required for each spring cartridge 13 in both area and height. In this embodiment, compression springs are used to preload each hinge strap cartridge, as shown in FIG. 6. Other embodiments include using elastomeric elements as compression springs to apply the needed strap tension force and tension springs that attach to the cartridges.

FIG. 6 illustrates a spring cartridge that comprises a rod base 16 anchored to one module with at least one guide rod 17 surrounded by a compression spring 18. The rod base 16 provides a fixed support for the guide rod 17, as well as a fixed surface against which the compression spring 18 pushes. The guide rod 17 passes through the center region of the compression spring 18, which pushes against the sliding cartridge 19, which also travels on the guide rod 17. The sliding cartridge 19 is attached to the sprung end 14 of a strap and provides tension which removes slack in the strap as the modules travel through their range of motion.

Figure 7:
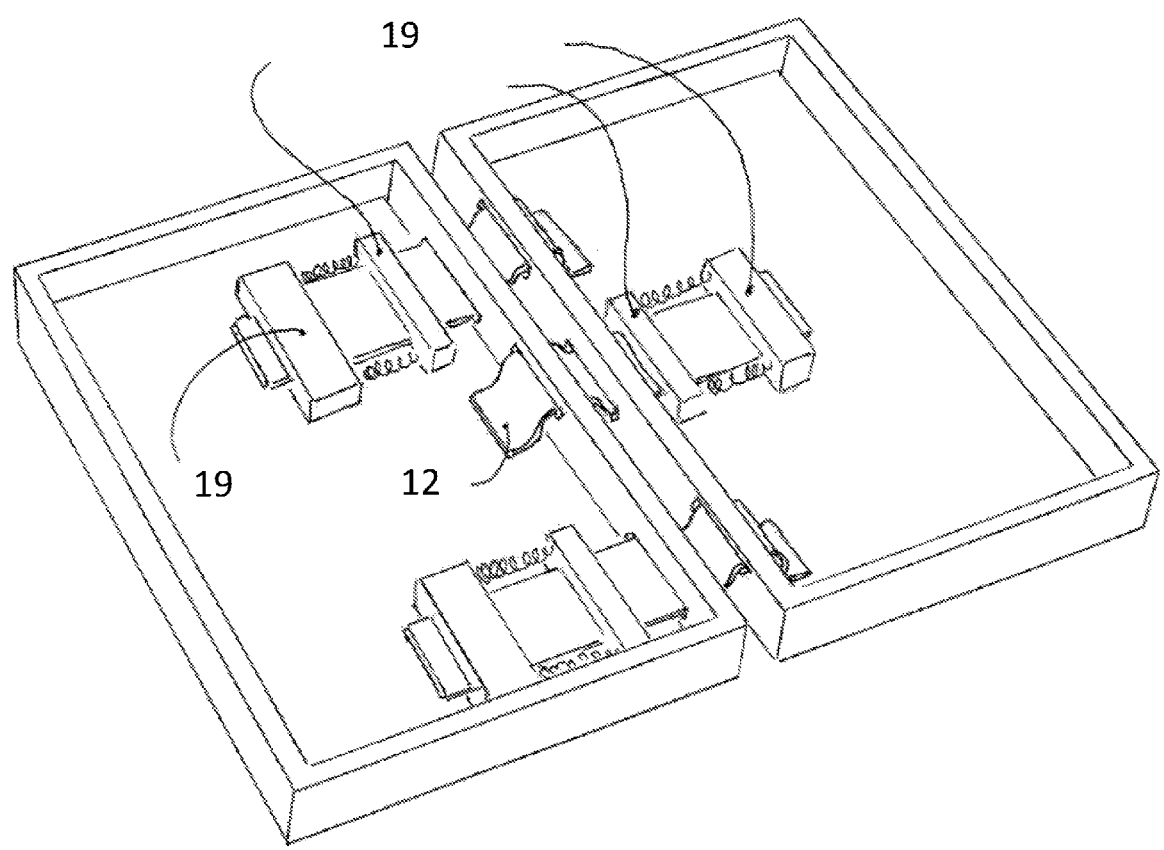
FIG. 7 is a view of the hinge mechanism and modules.

FIG. 7 illustrates a set of spring cartridges. The device of FIG. 7 corresponds to the 180 degree position of FIG. 3. The fixed end of the hinge strap exits the left-hand module through an upper slit, and the sliding end of the hinge strap enters the right-hand module through a lower slit as shown in FIG. 7. To counteract the forces caused by one strap, an opposing hinge strap with a fixed end exiting the upper slit of the right-hand module enters the left-hand module through a lower slit. This configuration allows the user access to the large open space in the upper region of the modules, which may be used for portable electronic devices such as laptops, or other devices needing this optimized layout.

An odd number of hinge straps is chosen in this embodiment to balance unwanted moments. An even number of sprung hinge straps tends to pull the units in one direction, and an odd number of sprung hinge straps tends to pull the units in opposing directions. In this embodiment, spring forces are chosen such that in the 180 degree position, the two opposing forces are substantially balanced, which allows the unit to lie flat.

In this embodiment, with strap entry and exit locations as shown in high and low positions, one benefit of this design is that it minimizes the amount of travel that the straps make to maintain tension on the modules during their range of rotational motion. Minimizing the travel required by the straps has many additional benefits, including that a smaller travel length allows for a smaller displacement of the strap attachment point, and therefore a smaller displacement of the springs. Smaller displacement of the springs results in a substantially consistent spring force and resulting hinge force throughout the range of motion of the modules. This yields a consistent feel, smoothness and interaction as the modules rotate through their range of motion. In addition, a smaller travel length allows for a smaller displacement of the strap attachment point, which in this embodiment allows for the envelope of motion of the internal moving cartridge components to be minimized.

In this embodiment, when the moving module reaches approximately 90 degrees, it is then supported by the fixed end of the strap exiting the other module. This creates the benefit of not having the motion of the moving module abruptly shift. The motion of the modules is substantially smooth and consistent. The friction of the straps moving in and out of their entry and exit points and the tension from the spring cartridges, creates a motion substantially like opening a bound book or a spiral notebook.

In a two module portable electronic device that incorporates the hinge mechanism described above, an electronic signal must pass from one module to another. The communication means may include a low-profile flat ribbon cable hidden and protected by at least one of the hinge straps. The hinge straps, including the strap through which the hinge cable passes, are all anchored at one end to the enclosure and are attached to a sliding spring cartridge on the other end. In one embodiment, all hinge straps are woven nylon tubular webbing; however, another configuration includes two flat straps sandwiching the ribbon cable. The durable nylon hides the ribbon cable and protects it from abrasion as the hinge straps bend and slide in and out of the enclosure throughout the range of hinge motion. In the present embodiment, the center strap, heretofore referred to as the hinge cable strap, has the flat ribbon cable passing through it.

Figure 8:
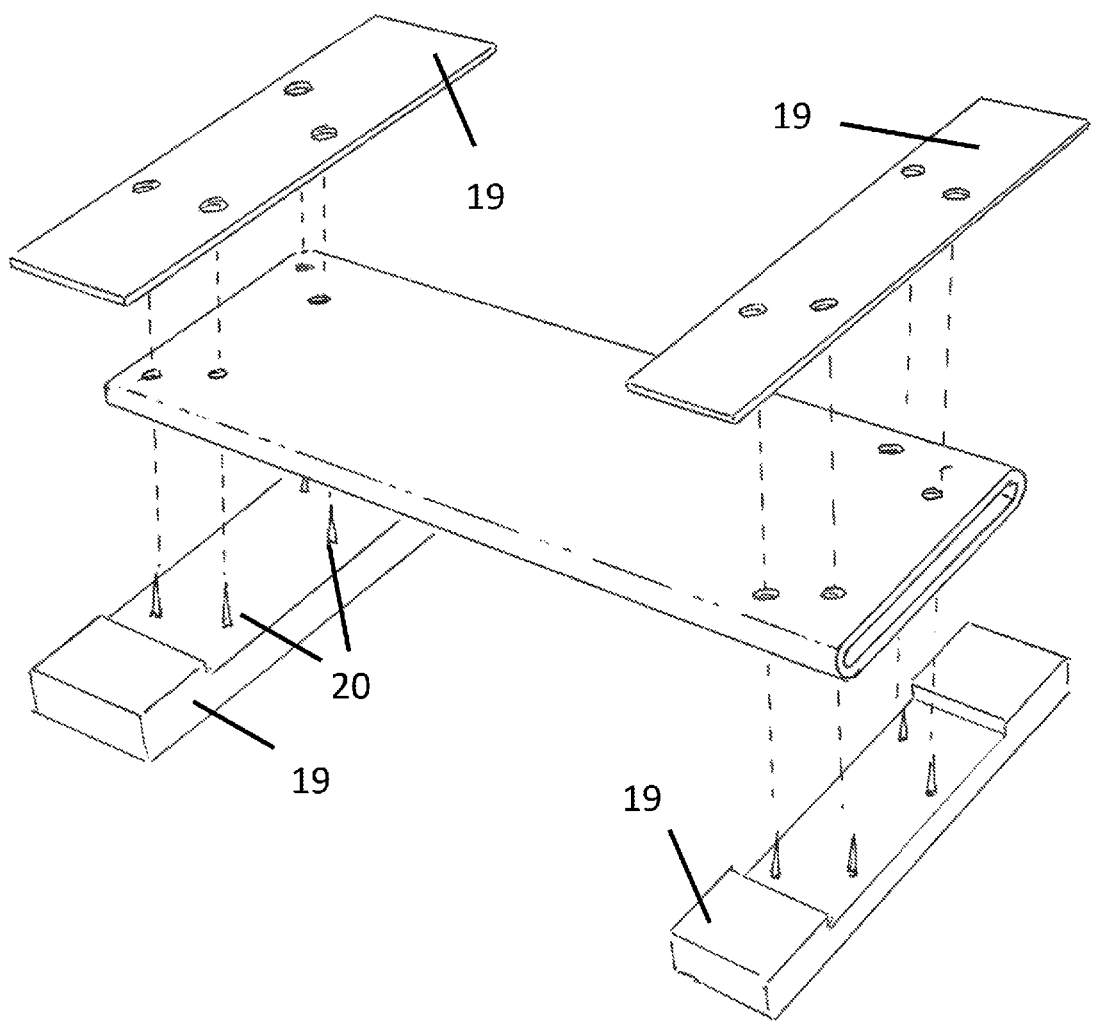
FIG. 8 is a view of a hinge cable strap.

The hinge cable strap functions in a similar way to its neighboring hinge straps, however, due to the delicate nature of the fine communication wires, it is critical that the tension in the hinge cable strap does not get transferred to the ribbon cable and that the ribbon cable does not get clamped or compressed. The hinge cable strap may use two sliding cartridges for two different purposes, as shown in an exploded view in FIG. 8. The sliding cartridges 19 attach to the strap by piercing the fabric from below and supporting the posts 20 from above. The sprung end operates in the same manner as the other hinge straps, however the fixed end uses similar spring cartridge piercing posts and a supporting top as the sprung end, but is anchored to the enclosure. This combination of spring cartridges transmits tension to the hinge cable strap, while creating a passageway for delicate communication wires without clamping them. The posts can be thermally formed after inserted through the top piece, creating a low-profile, fastener-less method of holding a fabric strap.

Figure 9:
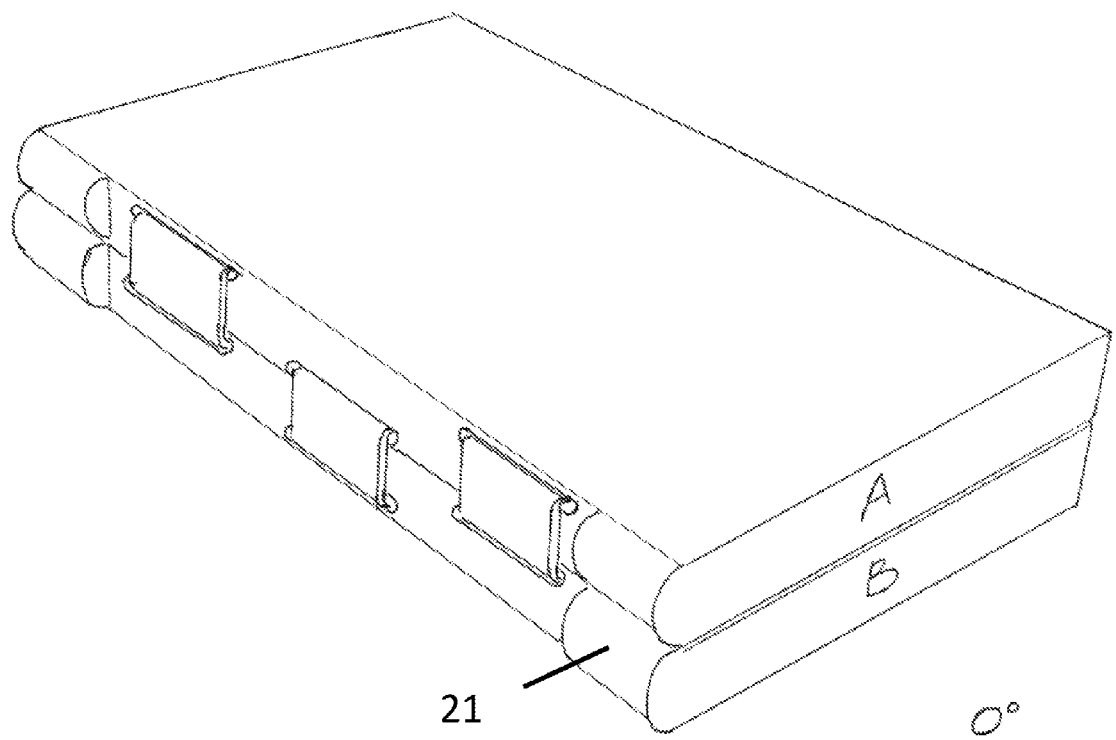
FIG. 9 is a view of a hinge mechanism with a cam in the closed position (0°).
Figure 10:
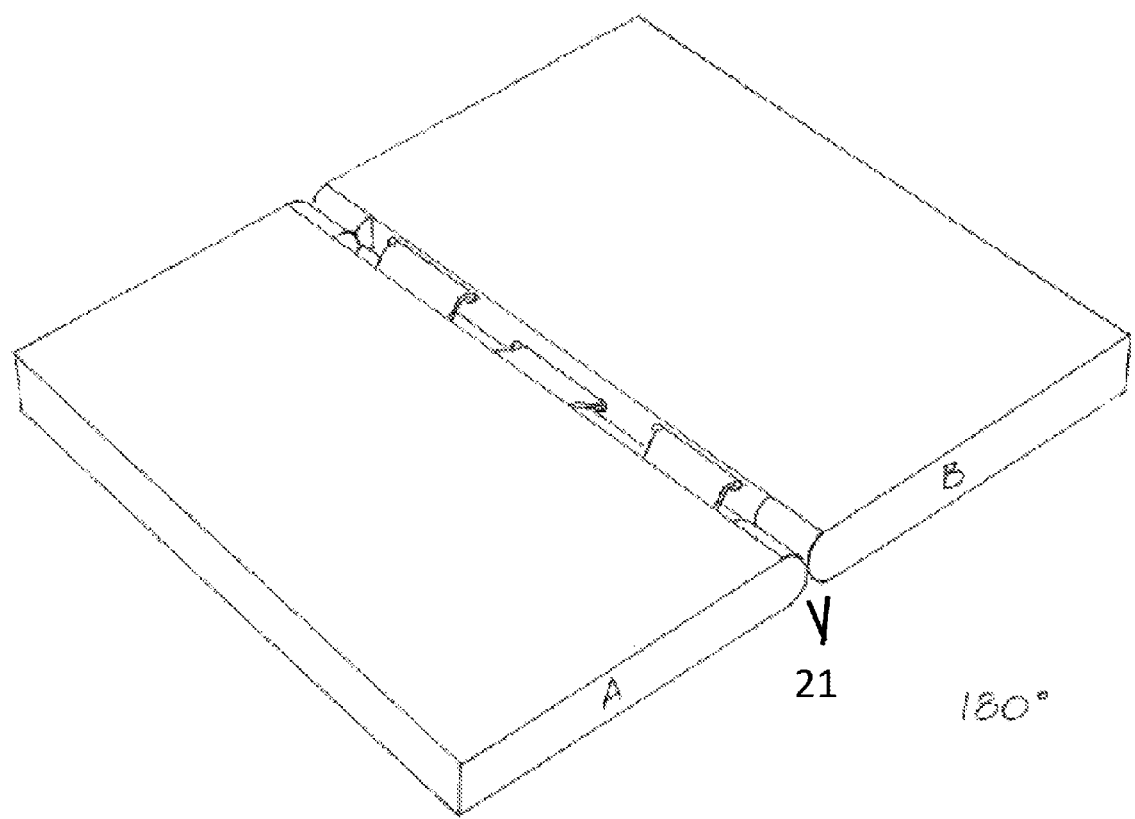
FIG. 10 is a view of a hinge mechanism with a cam in the open position (180°).
Figure 11:
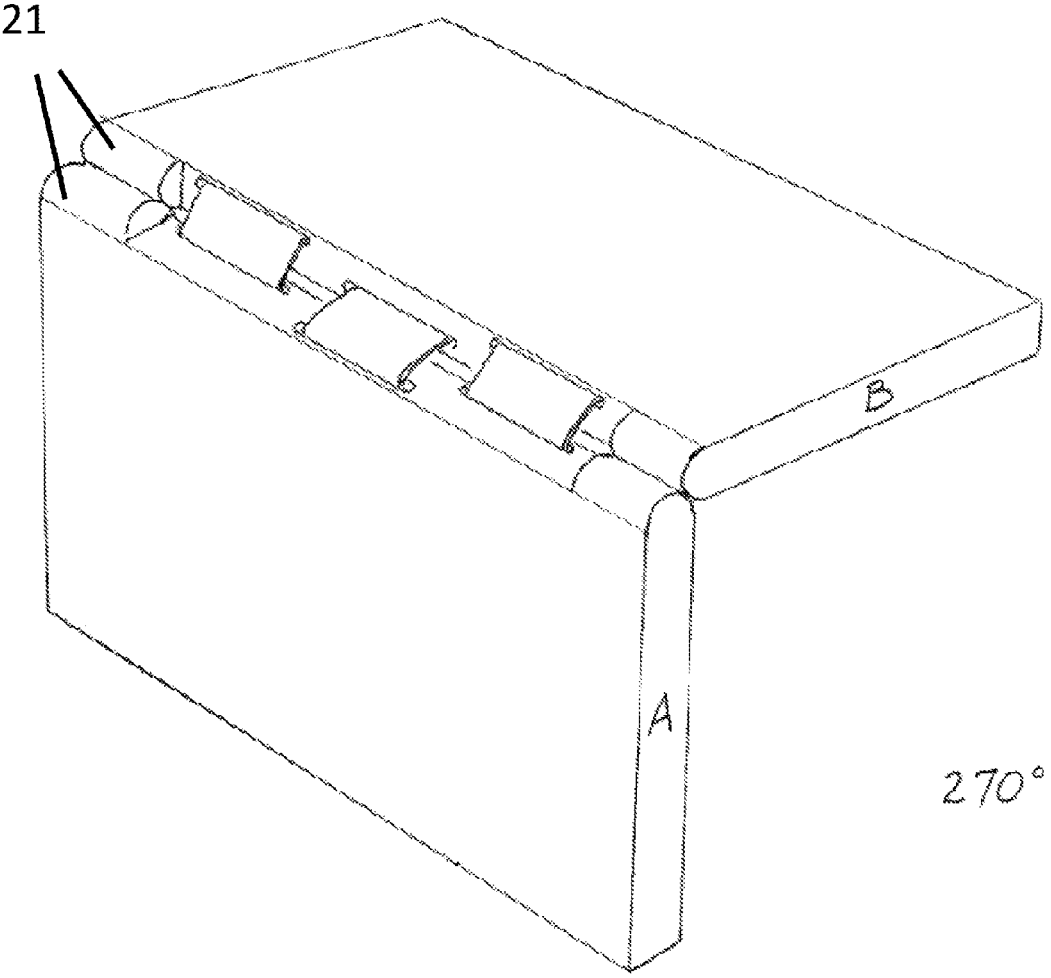
FIG. 11 is a view of a hinge mechanism with a cam in an intermediate position (270°).
Figure 12:
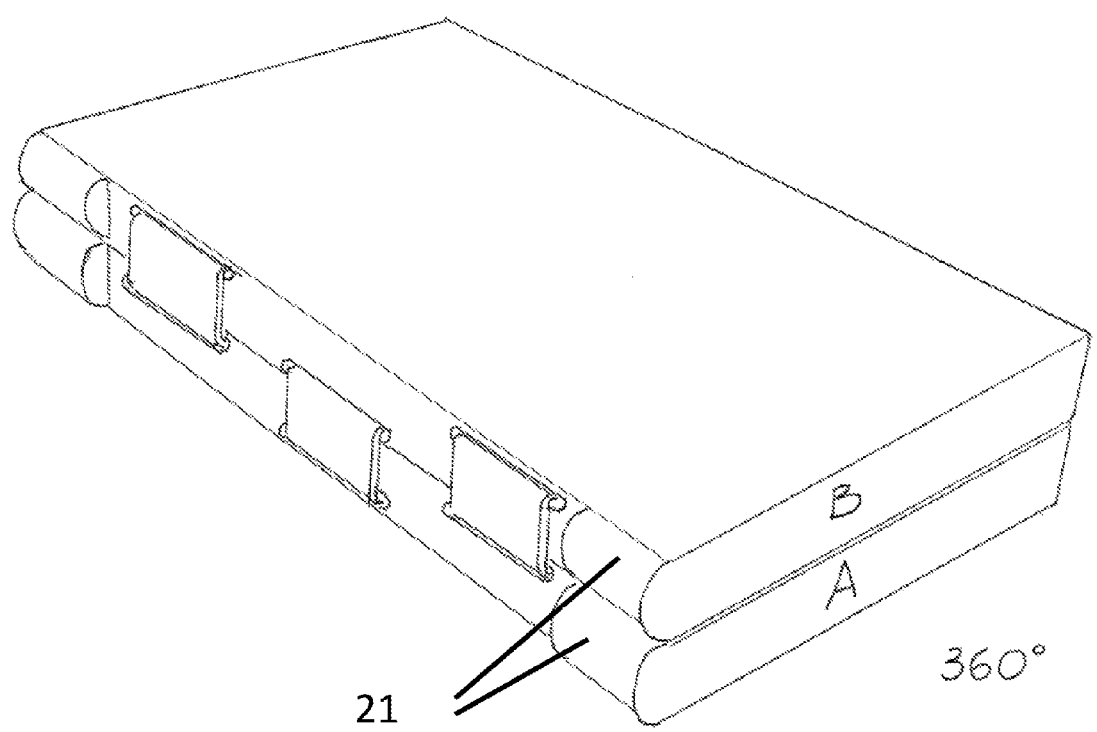
FIG. 12 is a view of a hinge mechanism with a cam in a rotated closed position (360°).

An additional embodiment is to not have the hinge straps slide into and out of the enclosure. In another embodiment, hinge straps enter and exit through slits as mentioned above, but rather than two distinct pivot points, the rotation of one module with respect to the other is defined by rolling along cam shaped surfaces 21, as shown in FIG. 9. The operation of the cam hinge is shown as it travels from zero degrees in FIG. 9, through 180 degrees in FIG. 10, 270 degrees in FIG. 11 and up to 360 degrees in FIG. 12.

An elliptical cam shape has major axes tangent to the top and bottom surface of each module. The strap entry and exits correspond to the focus points of the ellipse. The exposed length of the straps does not change as the two modules move with respect to each other. In practice, the hinge straps may stretch over time. To accommodate this deviation from the ideal case, spring cartridges such as those mentioned above are used to keep tension in the hinge straps. Since the hinge straps substantially do not slide in or out of the enclosures, the spring cartridges do not require the same travel and can fit in an even smaller footprint.

Figure 13:
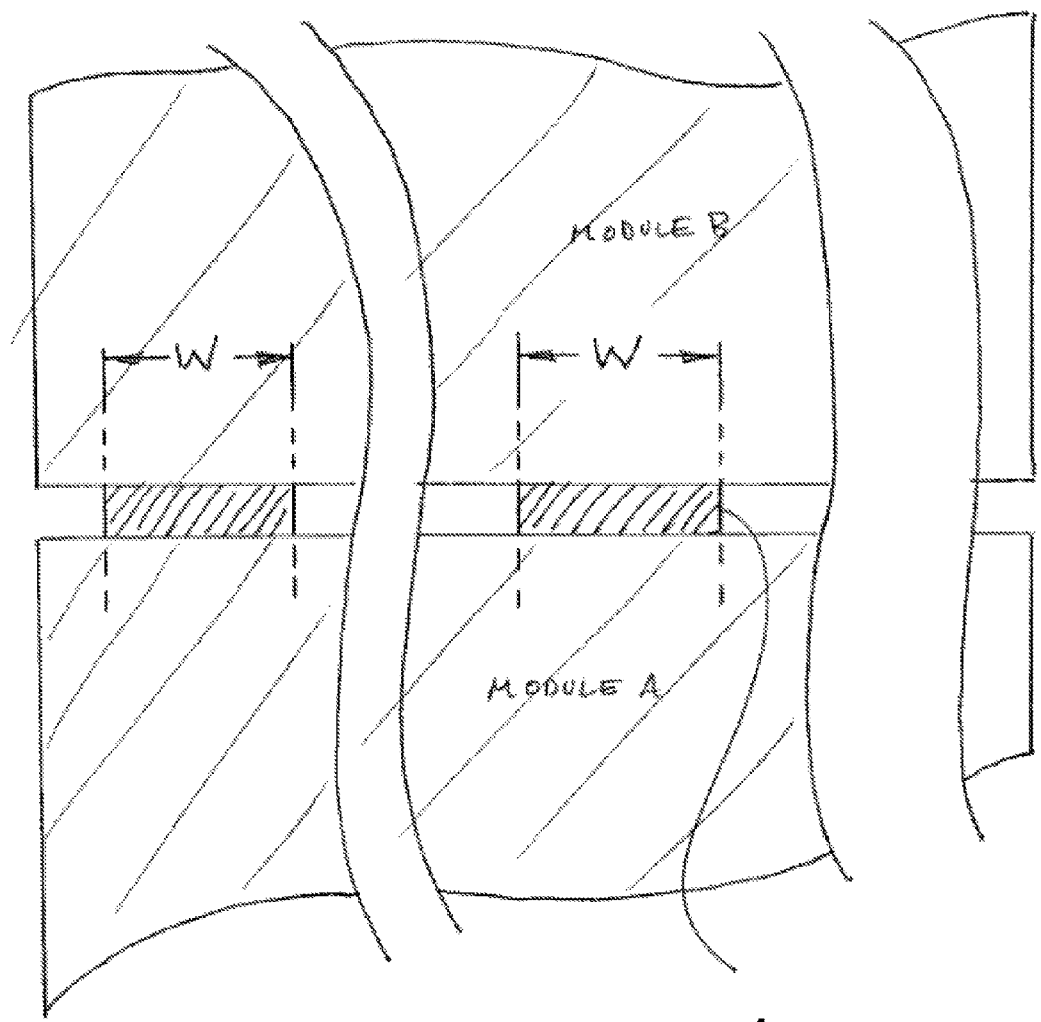
FIG. 13 is a view of a hinge mechanism with wide straps.

In another embodiment, the straps 4 have a relatively large width W with respect to the modules they attach, as shown in FIG. 13. This yields the benefit of increased lateral stiffness.

Figure 14:
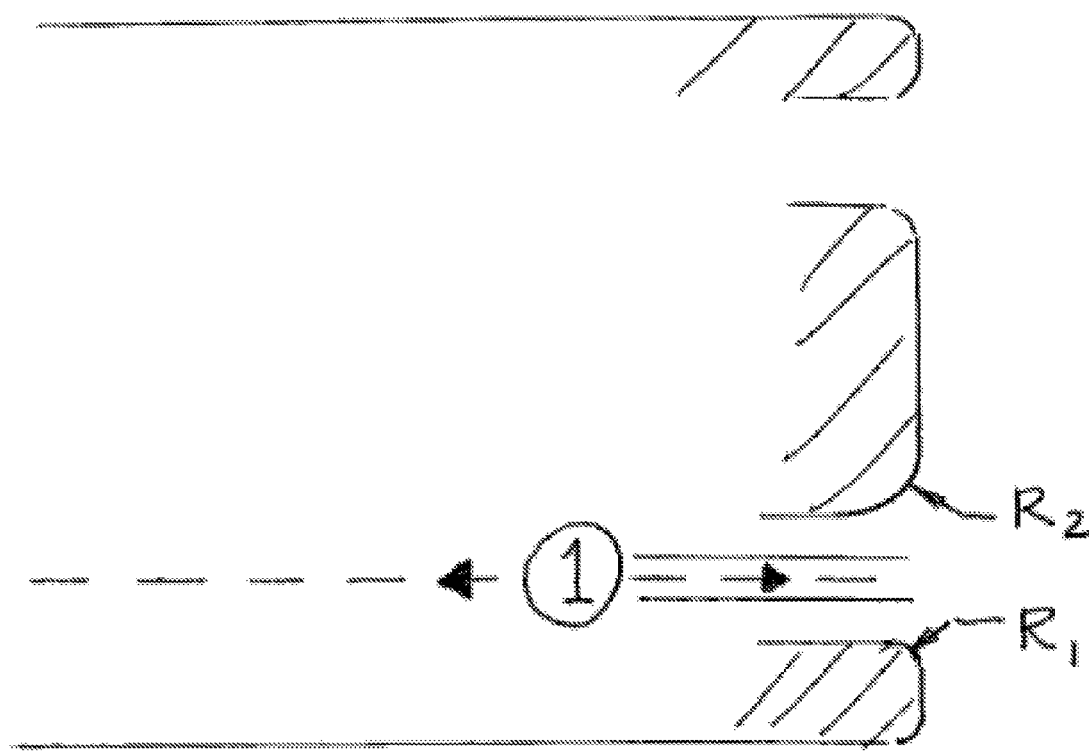
FIG. 14 is a view of a module showing slit geometry.

In this embodiment, placing the moving sections of the strap at the lower section allows for added material room for a larger radius to allow for smoother, lower friction motion of the mechanism, as shown in FIG. 14. Placing the moving sections of the strap at the lower section of the module allows for more usable space in the upper region as may be occupied by a display in an electronic reader.

Figure 15:
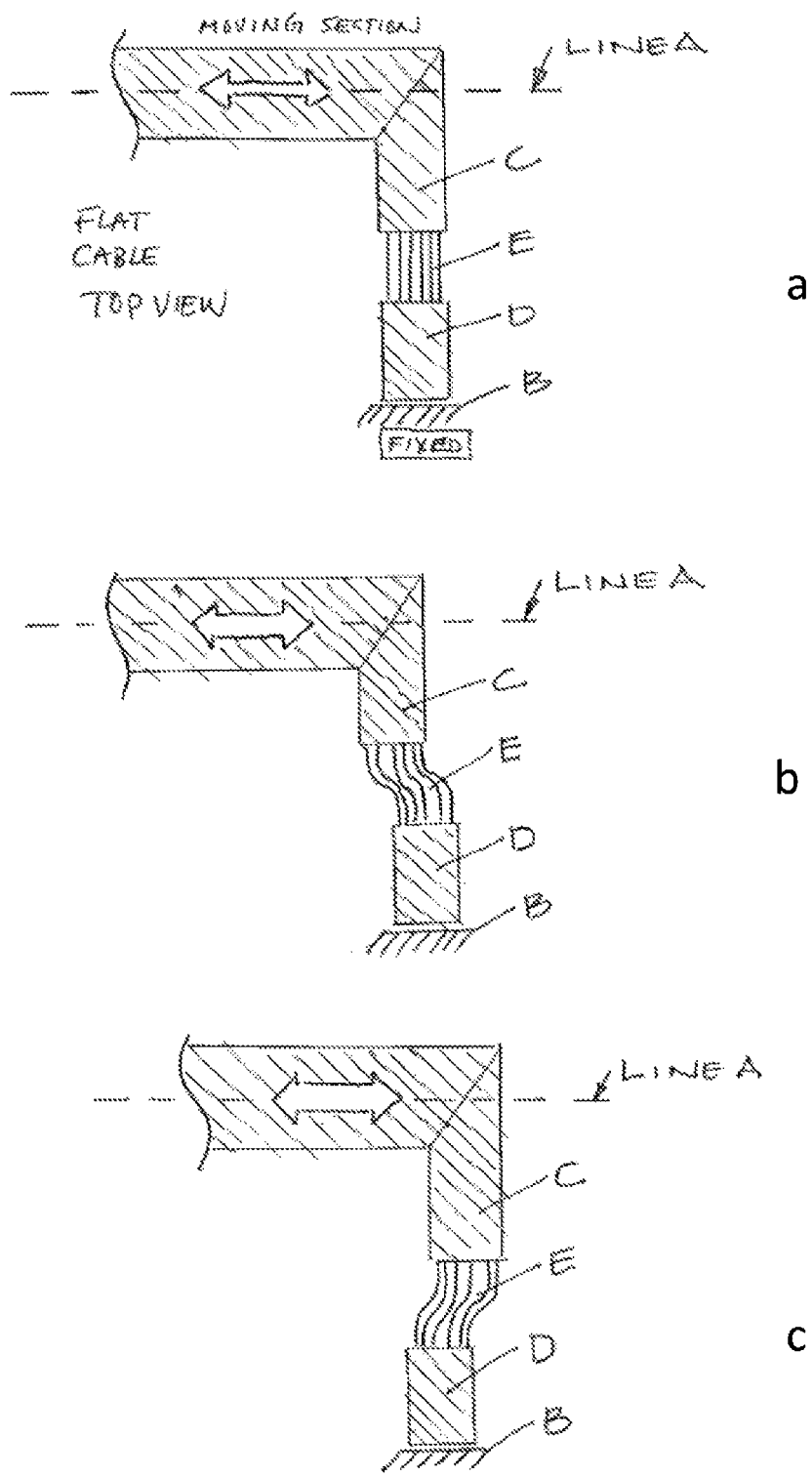
FIG. 15 is a schematic view of the hinge cable and hinge cable strap through a range of motion.

The cable moves in and out of the modules. FIGS. 15 *a, b,* and *c* illustrate a fixed end B. A section of the cable is made to be compliant in the plane to allow for this movement of the cable and for it to stay flat throughout its range of motion. In FIG. 15, the cable moves along Line A, section C moves, section E is compliant—in this embodiment it is a stripped region of the cable without any tape to constrain it—section D is fixed to area B.

Figure 16:
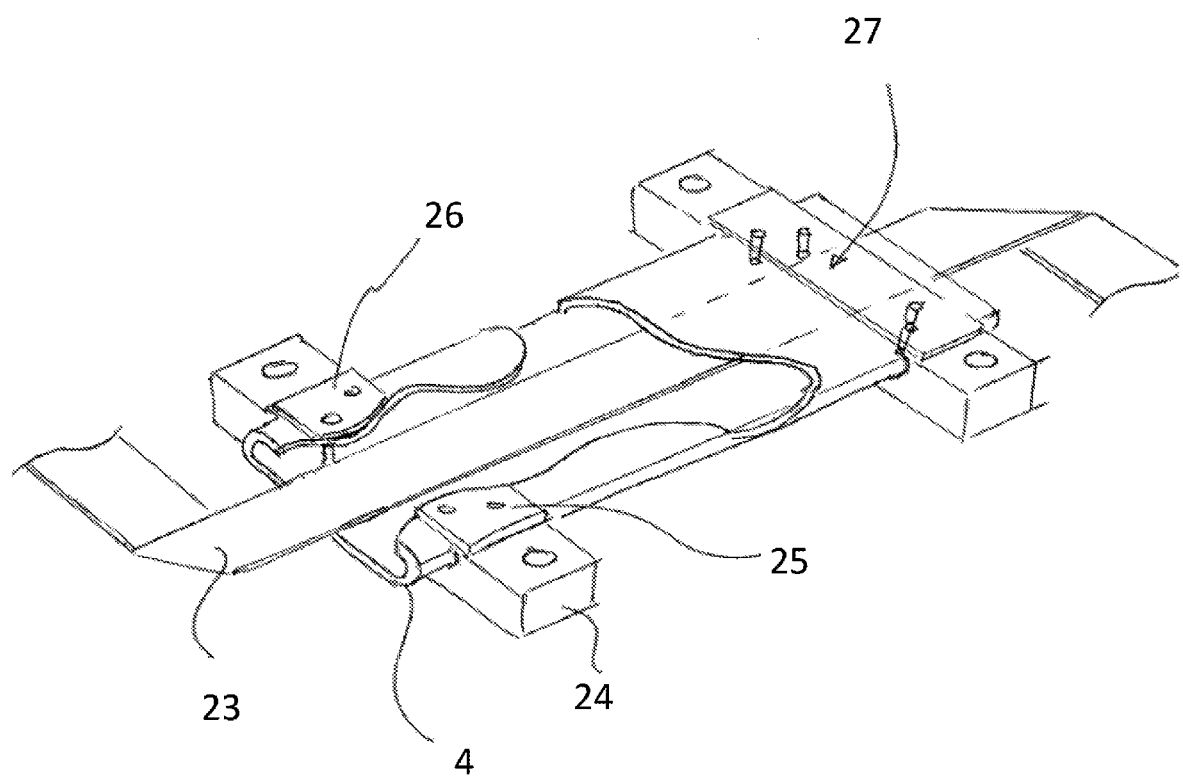
FIG. 16 is a view of a hinge cable assembled into a hinge cable strap.

A more detailed view of the hinge cable 23 passing through the hinge cable strap 4 is shown in FIG. 16.

In sum, the invention includes a hinge mechanism connecting two modules. The hinge mechanism operates such that the modules can rotate with respect to one another and can maintain contact with one another or maintain a minimal gap. The hinge mechanism also operates such that bulky internal or external hardware is not required. The hinge mechanism uses flexible members that can support tension loads between the two modules and allows for up to 360 degrees of rotation between the two modules, while maintaining substantially constant contact or a minimal gap between the hinged modules. In addition, when the two modules are moved with respect to one another, the hinge mechanism produces a substantially continuous feel of traditional rotation about an axis. The hinge mechanism also allows another member to pass protected between the modules such that no tension is placed on the member.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A device, comprising:
    a first housing body with a first hinged end, a first free end, and a first fastening surface between the first hinged end and the first free end,
    a second housing body with a second hinged end, a second free end, and a second fastening surface between the second hinged end and the second free end, and
    a plurality of hinge straps including a first hinge cable strap enclosing an electronic cable;
    a first sliding cartridge comprising a rod base, a guide rod, a compression spring, said first sliding cartridge affixed to the second housing body at the second fastening surface and completely located inside the second housing body;
    wherein:
        the first hinge cable strap is fixed to the first fastening surface and passes through the first hinged end in a high position and through the second hinged end in a low position;
        the first hinge cable strap is connected to the first sliding cartridge, wherein the first sliding cartridge provides substantially constant resistance during 360° rotation between the first housing body and the second housing body.

2. The device of claim 1 wherein said compression spring is a tension spring.

3. The device of claim 1 wherein the rod base is anchored to the second fastening surface, the guide rod is supported by the rod base, and the compression spring surrounds the rod base.

4. The device of claim 1 wherein the first hinge cable strap member has substantially no stretch in tension.

5. The device of claim 1 wherein the first hinge cable strap comprises a fabric with substantially no stretch in tension.

6. The device of claim 1 wherein the first hinged end has a first cam shaped surface and the second hinged end has a second cam shaped surface such that the rotation occurs by rolling between the first cam shaped surface and the second cam shaped surface.

7. The device of claim 1 wherein the first hinge cable strap forms an enclosure that allows relative motion between the first hinge cable strap and the electronic cable along the length of the first flexible member.

8. The device of claim 1, wherein the first hinge cable strap encloses the electronic cable, but only the first hinge cable strap is fastened to the sliding cartridge.

9. The device of claim 8, wherein the first hinge cable strap is fastened to the first sliding cartridge through a pierced connection.

10. The device of claim 1, wherein the electronic cable is flat ribbon cable hidden by the first hinge cable strap.

11. The device of claim 1, wherein the plurality of hinge straps comprises a second flexible member and a third flexible member to provide an odd number of flexible members, and the second flexible member and the third flexible member are each connected to a second sliding cartridge and a third sliding cartridge, respectively, wherein the second sliding cartridge and the third sliding cartridge are affixed to the first fastening surface and located completely within the first housing body.

12. The device of claim 11, wherein the first sliding cartridge, the second sliding cartridge, and the third sliding cartridge provide balanced and opposing spring forces when the first housing body and the second housing body are in a flat open position.

13. The device of claim 11, wherein the second flexible member and the third flexible member are each fixed to the second fastening surface and each passes through the first hinged end in the low position and through the second hinged end in the high position.

14. The device of claim 11, wherein the first hinge cable strap is arranged in a center position between the second flexible member and the third flexible member.

15. A dual panel electronic book reader, comprising:
a first housing body with a first display, a first hinged end, a first free end, and a first fastening surface between the first hinged end and the first free end,
a second housing body with a second display, a second hinged end, a second free end, and a second fastening surface between the second hinged end and the second free end, and
a plurality of hinge straps including a first hinge cable strap enclosing an electronic cable;
a first sliding cartridge comprising a rod base, a guide rod, a compression spring, said first sliding cartridge affixed to the second housing body at the second fastening surface and completely located inside the second housing body;
wherein:
the first hinge cable strap is fixed to the first fastening surface and passes through the first hinged end in a high position and through the second hinged end in a low position;
the first hinge cable strap is connected to the first sliding cartridge, wherein the first sliding cartridge provides substantially constant resistance during 360° rotation between the first housing body and the second housing body.

16. The dual panel electronic book reader of claim 15, wherein the plurality of hinge straps comprises a second flexible member and a third flexible member to provide an odd number of flexible members, and the second flexible member and the third flexible member are each connected to a second sliding cartridge and a third sliding cartridge, respectively, wherein the second sliding cartridge and the third sliding cartridge are affixed to the first fastening surface and located completely within the first housing body.

17. The dual panel electronic book reader of claim 16, wherein the first sliding cartridge, the second sliding cartridge, and the third sliding cartridge provide balanced and opposing spring forces when the first housing body and the second housing body are in a flat open position.

18. The dual panel electronic book reader of claim 16, wherein the second flexible member and the third flexible member are each fixed to the second fastening surface and each passes through the first hinged end in the low position and through the second hinged end in the high position.

* * * * *

UNITED STATES PATENT AND TRADEMARK OFFICE
CERTIFICATE OF CORRECTION

PATENT NO.         : 8,826,495 B2                              Page 1 of 1
APPLICATION NO.    : 13/151164
DATED              : September 9, 2014
INVENTOR(S)        : Nathan Isaiah Jauvtis et al.

It is certified that error appears in the above-identified patent and that said Letters Patent is hereby corrected as shown below:

On The Title Page, in item (75), in column 1, in "Inventors", line 1, delete "San Francsico," and insert -- San Francisco, --, therefor.

On The Title Page, in item (75), in column 1, in "Inventors", line 2, delete "Philip J. Houdek, II," and insert -- Philip J. Houdek II, --, therefor.

On The Title Page, in item (57), in column 2, in "Abstract", line 7, delete "though" and insert -- through --, therefor.

Signed and Sealed this
Twenty-seventh Day of January, 2015

Michelle K. Lee
*Deputy Director of the United States Patent and Trademark Office*